United States Patent
Niazi et al.

(10) Patent No.: US 9,979,622 B2
(45) Date of Patent: May 22, 2018

(54) ELASTIC WAN OPTIMIZATION CLOUD SERVICES

(71) Applicant: Cisco Technology, Inc., San Jose, CA (US)

(72) Inventors: Haseeb Niazi, Cary, NC (US); Sunil Cherukuri, Morrisville, NC (US); Mohammed Khalid, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 859 days.

(21) Appl. No.: 13/953,862

(22) Filed: Jul. 30, 2013

(65) Prior Publication Data
US 2015/0039744 A1    Feb. 5, 2015

(51) Int. Cl.
| G06F 15/173 | (2006.01) |
| H04L 12/26 | (2006.01) |
| H04L 12/24 | (2006.01) |

(52) U.S. Cl.
CPC ...... *H04L 43/0876* (2013.01); *H04L 41/0806* (2013.01); *H04L 41/0823* (2013.01); *H04L 43/16* (2013.01)

(58) Field of Classification Search
CPC . H04L 41/0806; H04L 41/0823; H04L 43/16; H04L 43/0876; H04L 41/5019; H04L 41/5025
USPC ........................................................ 709/224
See application file for complete search history.

(56) References Cited

U.S. PATENT DOCUMENTS

| 6,842,783 B1* | 1/2005 | Boivie ............... H04L 12/2602 370/235 |
| 7,020,082 B2* | 3/2006 | Bhagavath .......... H04L 12/2602 370/230 |
| 7,289,441 B1 | 10/2007 | Barach |
| 7,522,518 B1* | 4/2009 | Satapathy ............. H04W 28/16 370/229 |
| 7,936,675 B2* | 5/2011 | Bailey ................. H04L 12/5695 370/229 |
| 8,200,188 B2* | 6/2012 | Gans ....................... H04L 12/14 370/230 |
| 8,965,955 B2* | 2/2015 | Agarwal ................. H04L 69/16 709/203 |
| 9,009,322 B1* | 4/2015 | Molleti ................. H04L 45/125 709/224 |
| 2003/0235209 A1* | 12/2003 | Garg .................... H04L 12/4675 370/468 |
| 2008/0288614 A1 | 11/2008 | Gil et al. |
| 2010/0095021 A1* | 4/2010 | Samuels ................ H04L 47/724 709/235 |
| 2010/0121972 A1* | 5/2010 | Samuels ............... H04L 41/082 709/231 |
| 2010/0131668 A1* | 5/2010 | Kamath ................. H04L 47/32 709/233 |

(Continued)

*Primary Examiner* — Joseph Avellino
*Assistant Examiner* — Binod J Kunwar
(74) *Attorney, Agent, or Firm* — Parker Ibrahim & Berg LLP; James M. Behmke; Stephen D. LeBarron

(57) ABSTRACT

In one embodiment, a cloud network provides cloud services to the one or more clients, where data usage of each client is monitored on a per client basis. If the data usage of any client is above a first predetermined threshold, then a WAN optimization platform is automatically implemented within the cloud network for the client having the data usage determined to be above the first predetermined threshold.

20 Claims, 5 Drawing Sheets

(56) References Cited

U.S. PATENT DOCUMENTS

| | | | |
|---|---|---|---|
| 2010/0146074 A1* | 6/2010 | Srinivasan | G06F 9/5077 709/218 |
| 2010/0318647 A1* | 12/2010 | Savoor | G06Q 50/06 709/224 |
| 2011/0255404 A1* | 10/2011 | Kafka | H04L 41/0896 370/232 |
| 2012/0198046 A1* | 8/2012 | Shah | G06Q 30/04 709/224 |
| 2012/0233333 A1 | 9/2012 | Ganesan et al. | |
| 2013/0031240 A1 | 1/2013 | Byzek | |
| 2013/0033994 A1* | 2/2013 | Parekh | H04L 43/026 370/252 |
| 2013/0121209 A1* | 5/2013 | Padmanabhan | H04L 41/0823 370/255 |
| 2013/0122882 A1* | 5/2013 | Patel | H04L 41/0886 455/418 |
| 2013/0132559 A1* | 5/2013 | Kotecha | H04L 43/0876 709/224 |
| 2013/0196616 A1* | 8/2013 | Zalmanovitch | H04L 43/045 455/405 |
| 2013/0215748 A1* | 8/2013 | Ratakonda | H04L 43/12 370/235 |
| 2013/0268799 A1 | 10/2013 | Mestery et al. | |
| 2014/0018035 A1* | 1/2014 | Albisu | H04L 12/1403 455/406 |
| 2014/0075012 A1* | 3/2014 | Peterson | H04L 47/22 709/224 |
| 2014/0149562 A1* | 5/2014 | Xiao | H04L 41/0879 709/222 |
| 2014/0317284 A1* | 10/2014 | Navarette | H04L 43/0876 709/224 |
| 2016/0006645 A1* | 1/2016 | Rave | H04L 12/2854 709/203 |

\* cited by examiner

ELASTIC WAN OPTIMIZATION CLOUD SERVICES

TECHNICAL FIELD

The present disclosure relates generally to computer networks, and, more particularly, for wide-area network (WAN) optimization for cloud services.

BACKGROUND

Cloud computing can be generally defined as Internet-based computing in which computing resources are dynamically provisioned and allocated to client or user computers or other devices on-demand from a collection of resources available via the network (e.g., "the cloud"). Cloud computing resources, for example, may include any type of resource such as computing, storage, network devices, virtual machines (VMs), etc. For instance, resources may include service devices (firewalls, deep packet inspectors, traffic monitors, etc.), processing devices (brute force processing capability), storage devices (e.g., servers, network attached storages, storage area network devices), etc., and may be used for instantiation of VMs, databases, applications (Apps), etc.

Cloud computing is dynamically scalable and often virtualized resources are provided as a service to individuals, small groups, and companies. Cloud consumers request resources such as compute, storage, and virtualized network services such as firewalls and load-balancers to develop, test, or deploy their applications. The resources are generally requested on an as-needed basis or preplanned. Cloud providers on the other hand fulfill these customer requests using dedicated and shared physical or virtual resources in a cost effective way.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
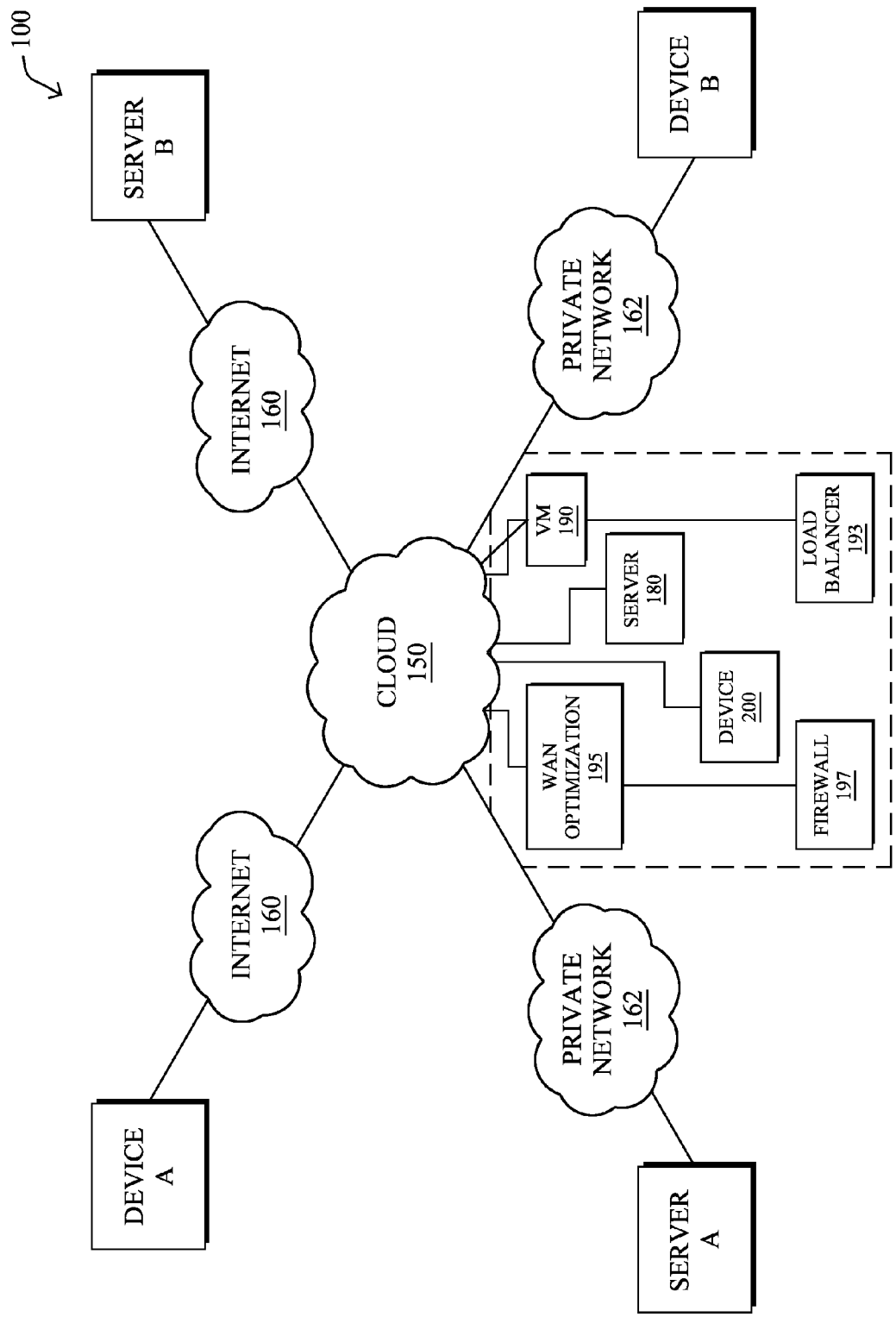
FIG. 1 illustrates an example communication network.

According to one or more embodiments of the disclosure, a cloud network provides cloud services to the one or more customers/clients, where data usage of each customer/client is monitored on a per customer/client, or per site or per VM/Application basis. If the data usage of any client is above a first predetermined threshold, then a WAN optimization platform is automatically implemented within the cloud network for the client having the data usage determined to be above the first predetermined threshold. In certain embodiments, the system continues to monitor the client and determines whether the data usage is below a second predetermined threshold, and if so disables the WAN optimization platform to make it available for other clients of the cloud. The WAN optimization services may also be deployed when certain pre-determined conditions exist—including but not limited to deployment based on time of the day, type of application, etc. The WAN optimization system is deployed automatically without user intervention.

Description

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect these nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, etc.

Cloud computing can be generally defined as Internet-based computing in which computing resources are dynamically provisioned and allocated to client or user computers or other devices on-demand from a collection of resources available via the network (e.g., "the cloud"). Cloud computing resources, for example, can include any type of resource such as computing, storage, and network devices, virtual machines (VMs), etc. For instance, resources may include service devices (firewalls, deep packet inspectors, traffic monitors, etc.), compute/processing devices (servers, CPU's, memory, brute force processing capability), storage devices (e.g., network attached storages, storage area network devices), etc., and may be used for instantiation of Virtual Machines (VM), databases, applications (Apps), etc.

Cloud computing resources may include a "private cloud", a "public cloud", and/or a "hybrid cloud". A "hybrid cloud" is a cloud infrastructure composed of two or more clouds that inter-operate or federate through technology. In essence, a hybrid cloud is an interaction between private and public clouds where a private cloud joins a public cloud and utilizes public cloud resources in a secure and scalable way.

FIG. 1 is a schematic block diagram of an example computer network 100 illustratively comprising nodes/devices interconnected by various methods of communication. For instance, links may be wired links or shared media (e.g., wireless links, etc.) where certain nodes may be in communication with other nodes based on physical connection, or else based on distance, signal strength, current operational status, location, etc. Those skilled in the art will understand that any number of nodes, devices, links, etc. may be used in the computer network, and that the view shown herein is for simplicity.

Specifically, devices "A" and "B" may comprise any device with processing and/or storage capability, such as personal computers, mobile phones (e.g., smartphones), gaming systems, portable personal computers (e.g., laptops, tablets, etc.), set-top boxes, televisions, vehicles, etc., and may communicate with the network 160 (internet or private networks) to cloud 150. In addition, one or more servers (Server A and B), network management servers (NMSs), control centers, etc., may also be interconnected with (or located within) the network 160 to cloud 150.

Cloud 150 may be a public, private, and/or hybrid cloud system. Cloud 150 includes a plurality of resources such as Firewalls 197, Load Balancers 193, WAN optimization platform(s) 195, device(s) 200, server(s) 180, and virtual machine(s) (VMs) 190. The cloud resource may be a combination of physical and virtual resources. The cloud resources are provisioned based on requests from one or more clients. Clients may be one or more devices, for example device A and/or B, or one or more servers, for example server A and/or B.

Data packets (e.g., traffic and/or messages) may be exchanged among the nodes/devices of the computer network 100 using predefined network communication protocols such as certain known wired protocols, wireless protocols or other protocols where appropriate. In this context, a protocol consists of a set of rules defining how the nodes interact with each other.

Figure 2:
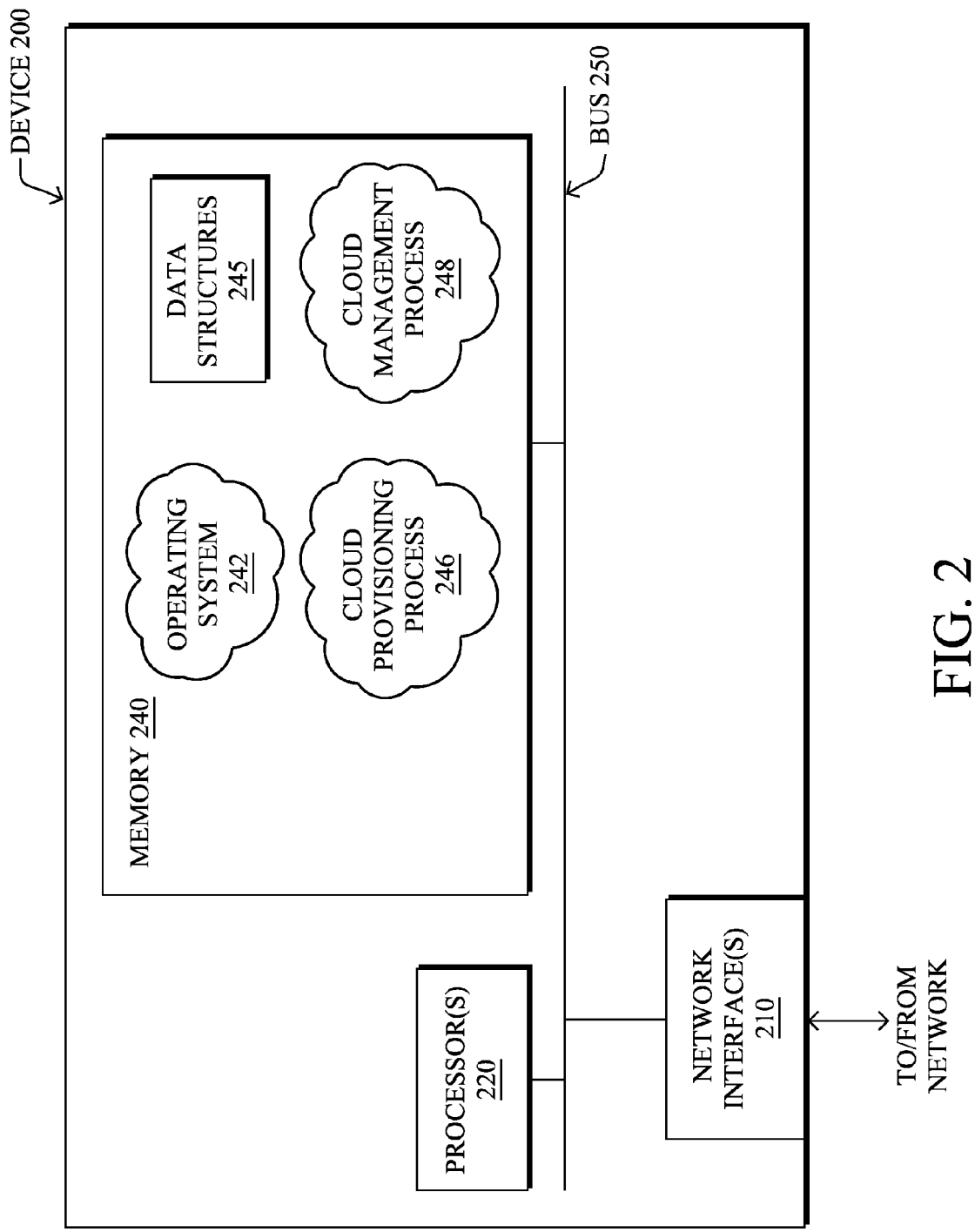
FIG. 2 illustrates an example network device/node.

FIG. 2 is a schematic block diagram of an example simplified computing device 200 that may be used with one or more embodiments described herein, e.g., particularly as a server 180, or, more particularly, as a representation of one or more devices as VM 190. The illustrative "device" 200 may comprise one or more network interfaces 210, at least one processor 220, and a memory 240 interconnected by a system bus 250. Network interface(s) 210 contain the mechanical, electrical, and signaling circuitry for communicating data over links coupled to network 100. The network interfaces 210 may be configured to transmit and/or receive data using a variety of different communication protocols, as will be understood by those skilled in the art. The memory 240 comprises a plurality of storage locations that are addressable by processor 220 for storing software programs and data structures associated with the embodiments described herein. The processor 220 may comprise necessary elements or logic adapted to execute the software programs and manipulate data structures 245. An operating system 242, portions of which are typically resident in memory 240 and executed by the processor, functionally organizes the device by, inter alia, invoking operations in support of software processes and/or services executing on the device. These software processes and/or services may comprise an illustrative "cloud management" process 248 and cloud provisioning process 246, as described herein. Alternatively, cloud management process 248 and/or cloud provisioning process 246 may be on separate devices 200 than the user cloud services It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes. For example, processor 220 can include one or more programmable processors, e.g., microprocessors or microcontrollers, or fixed-logic processors. In the case of a programmable processor, any associated memory, e.g., memory 240, may be any type of tangible processor readable memory, e.g., random access, read-only, etc., that is encoded with or stores instructions that can implement program modules, e.g., a module having resource allocation process encoded thereon. Processor 220 can also include a fixed-logic processing device, such as an application specific integrated circuit (ASIC) or a digital signal processor that is configured with firmware comprised of instructions or logic that can cause the processor to perform the functions described herein. Thus, program modules may be encoded in one or more tangible computer readable storage media for execution, such as with fixed logic or programmable logic, e.g., software/computer instructions executed by a processor, and any processor may be a programmable processor, programmable digital logic, e.g., field programmable gate array, or an ASIC that comprises fixed digital logic, or a combination thereof. In general, any process logic may be embodied in a processor or computer readable medium that is encoded with instructions for execution by the processor that, when executed by the processor, are operable to cause the processor to perform the functions described herein.

The techniques herein, propose using the cloud monitoring/management process 248 to constantly monitor usage bandwidth on a per customer basis and/or a per application or per server/VM basis. The cloud monitoring process 248 monitors WAN, LAN, and/or SAN links using various technologies. For example, the cloud monitoring process may use Network Based Application Recognition (NBAR), which is a mechanism that recognizes a dataflow or application by inspecting some packets sent. Alternatively or in addition, the cloud monitoring process may use Netflow, which is a network protocol used for collecting IP traffic information. Alternatively or in addition, the cloud monitoring process may use SPAN to send traffic to one or more Network Analysis Modules to perform traffic analytics. Additionally, any other traffic monitoring or packet monitoring technology may be used to monitor traffic on a per-client or per-application basis.

As described herein, when the cloud monitoring process 248 determines that aggregate data traffic reaches a first pre-defined threshold (High watermark) on a per-customer basis are met with respect to certain other conditions such as time of the day/week or application type etc., the cloud provisioning process 246 (or the cloud management process 248) implements a WAN optimization platform 195 between the source and destination of the customer/client traffic to reduce the data bandwidth/rate.

A WAN optimization platform is a set of physical and/or virtual resources configured to provide WAN optimization techniques for increasing data-transfer efficiencies across WANs. The WAN optimization platform (450 or 550) generally is a virtualized resource assigned to the customer/client. However, the WAN optimization platform may be a physical resource of the cloud assigned to the customer/client through the cloud. For example, the physical resource may be Cisco's™ Wide Area Application Services (WAAS) product that includes different WAN optimization techniques to optimize the performance of any TCP-based application operating in a WAN environment while preserving and strengthening branch security. An example of a virtual resource may be Cisco's™ virtual Wide Area Application Services (vWAAS) product that includes different WAN optimization techniques that accelerate applications delivered from private and virtual private cloud infrastructure, using policy-based on-demand orchestration.

The most common measures of data-transfer efficiencies (i.e., optimization) are throughput, bandwidth requirements, latency, protocol optimization, and congestion. In addition, the WAN itself can be classified with regards to the distance between endpoints and the amounts of data transferred. As such, various WAN optimization techniques may comprise deduplication (eliminating redundant data), compression (representing data patterns more efficiently), latency optimization (e.g., window-size scaling, selective acknowledgements, Layer 3 congestion control algorithms, etc.), caching/ proxying (storing data in local caches if it is repeatedly accessed), forward error correction (FEC) (mitigating packet loss by adding additional loss-recovery packets), protocol spoofing (bundling multiple requests), traffic shaping (controlling data flow), equalizing (reprioritizing data), and so on.

As such, different WAN optimization techniques may be used by one or more WAN optimization platforms to modify the transferred data to optimize the data transfer and lower data usage bandwidth. In particular, a WAN optimization platform may use one or more optimization techniques to modify the transferred data. While one technique is TCP flow optimization (TFO), which optimizes TCP parameters such as window sizes, maximum segment size, packet sequencing number, etc., to ensure efficient flow of packets over WAN, another technique is compression that compresses near source entry to cloud and decompresses data near destination (e.g., which may be implemented using Lempel-Ziv (LZ), persistent LZ (PLZ), and/or Lempel-Ziv-Renau (LZR) compression). Another technique is data redundancy elimination (DRE), which involves caching data near the source of entry to the cloud and near the destination within the cloud in order to avoid re-transmission of blocks of data that have already been received near the destination. As noted, other optimization techniques may include caching/proxy, forward error correction, protocol spoofing, traffic shaping. Also specific techniques may apply to video-streaming applications, audio-streaming application, certain types of file transfers, HTTP, etc. Accordingly, implementing a WAN optimization platform, as described herein, comprises activating one or more of the selected WAN optimization techniques described herein or otherwise understood by those skilled in the art.

After implementing the WAN optimization platform, the cloud management process 248 continues to monitor the data traffic and when the customer/client traffic goes to a second predefined-level (Low watermark) or if one of the other pre-defined conditions, such as time of day/week or application becomes inactive, are met, the cloud provisioning process 246 (or the cloud management process 248) disables the WAN optimization platform placed between the source and destination. If the WAN optimization platform is a virtual resource, then the instance is destroyed. If the WAN optimization platform is a physical resource, then the physical resource is reassigned to other cloud resources/customers.

The first predefined threshold for implementing a WAN optimization platform may be different than the second predefined threshold for disabling the WAN optimization platform. One or both predefined thresholds may be a fixed value or a percentage of a standard usage rate. The standard usage rate may be specific to a client, upload/download, and/or average usage based on time of day. Additionally, a different threshold may be used for uploading data versus downloading data. For example, the uploading threshold may be 70% of standard upload usage rates and the downloading threshold may be 80% of standard download usage rates. Also, one or both pre-defined thresholds may change based on the time of day based on standard levels of usage. Alternatively or in addition, the predefined threshold may be different for different clients or different types of clients.

The cloud monitoring/management process 248, and cloud provisioning process 246 may be separate entities from the Servers/VMs providing cloud services. The cloud monitoring/management process 248 may be a standalone Cloud Assurance system and the cloud provisioning process 246 may be a standalone Cloud Orchestration system.

Alternatively, the cloud monitoring/management 248 and cloud provisioning process 246 may be provided by Software Defined Networking (SDN) controllers. A SDN Controller may monitor the data traffic flows for each customer/client and the same or another SDN controller may store the data thresholds for each customer/client. The same or another SDN controller may automatically instantiate a WAN optimization platform/service for the customer/client and redirect data traffic flows through the WAN optimization device, when the first (High) pre-determined threshold is reached for a customer/client. When the second (Low) pre-determined threshold is reached for the customer/client, the same, previously used SDN controller, or another SDN controller may disable the WAN optimization platform/service for data flows below the second (low) threshold.

Illustratively, the techniques described herein may be performed by hardware, software, and/or firmware, such as in accordance with the illustrative "cloud management" process 248, which may contain computer executable instructions executed by the processor 220 of the one or more devices 200 to perform functions relating to the techniques described herein. For example, the techniques herein may be treated as extensions to conventional cloud management protocols, and as such, may be processed by similar components and devices understood in the art that execute those protocols, accordingly.

Figure 3:
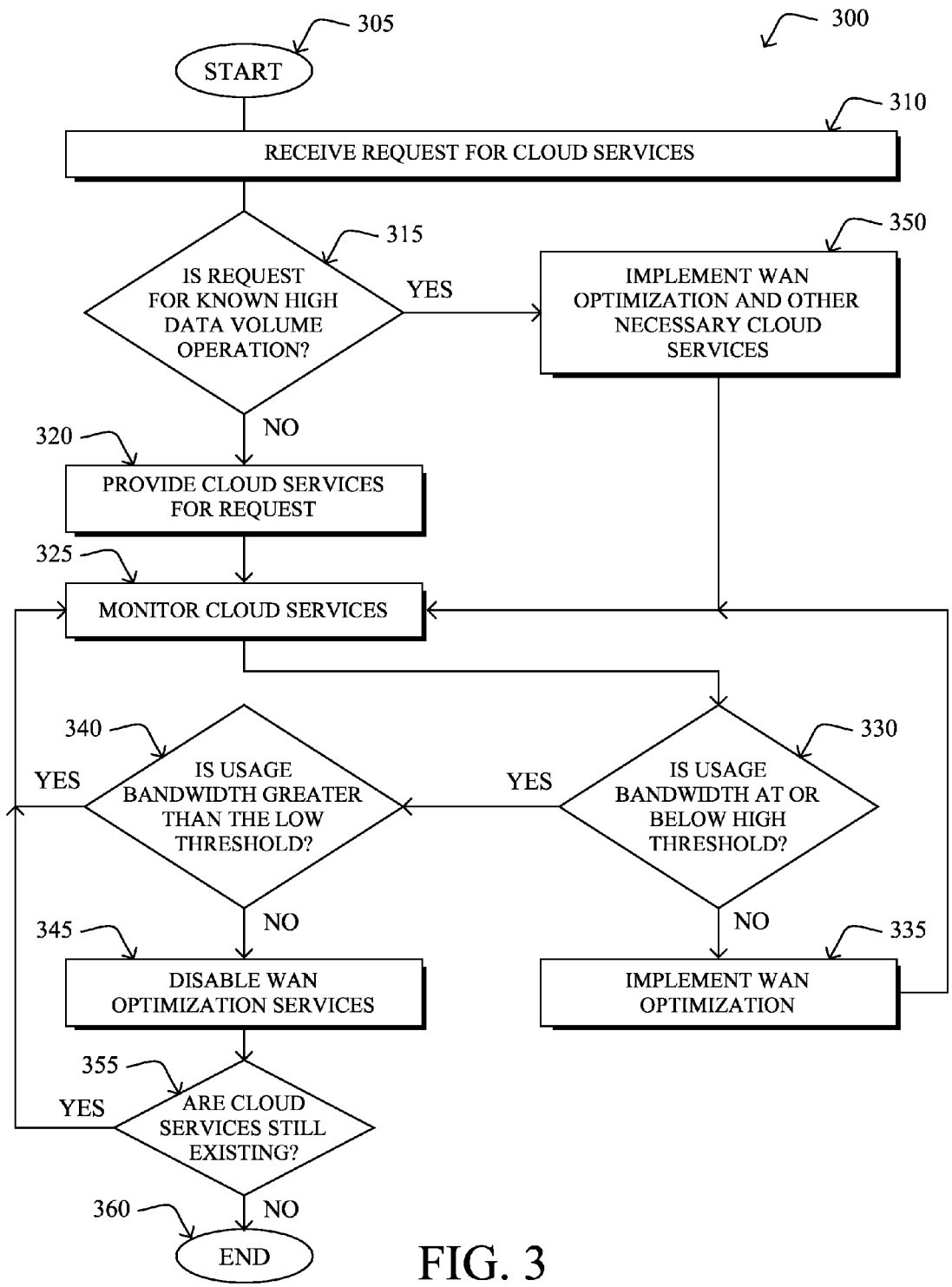
FIG. 3 illustrates an example simplified procedure for providing WAN optimization services in accordance with one or more embodiments described herein.

FIG. 3 illustrates an example procedure 300 for automatically provisioning a WAN optimization platform (450 or 550) within cloud 150 to a client in accordance with one or more embodiments described herein. The procedure 300 may start at step 305, and continues to step 310 when cloud 150 receives a request for cloud services from a client. The client may be any type of device or group of devices, which may include computers, mobile phones, tablets, servers, televisions, set top boxes, thin clients, etc. For example, the client may request services to store data on server 180 within cloud 150 or to transfer data over cloud 150 from server A to server B.

Next at step 315, a determination is made based on the type of cloud services requested. If the request is known as a high volume operation, then at step 350, a WAN optimization platform is placed within cloud 150 between the sending location and the destination location at about the same time that the requested cloud services are provisioned to the client. A request to backup data from an entire home server to the cloud server 180 or setup a backup copy of server A on server B using a path through cloud 150 may be examples of known high volume cloud services requests.

If the request for cloud services is not known as a high volume operation, then at step 320, the requested resources are provisioned to the client. Resources may include storage, processing, services, and/or networking resources. Then at step 325, the cloud management process 248 monitors usage bandwidth on a per client basis. Next at step 330, a determination is made if the usage bandwidth for the client is at or below a first predefined (HIGH) threshold. If no, then at step 335, a WAN optimization platform is implemented between the source and the destination within cloud 150. The WAN optimization platform generally is a virtual resource of cloud 150. After, the WAN optimization resource is implemented; the system continues to monitor the data usage of the client.

Additionally, the system may also determine if the deployed WAN optimization platform is sufficient to handle the traffic load generated by the client over the WAN. If the deployed WAN optimization platform is insufficient, then dynamically implementing additional WAN optimization platforms to handle the client's WAN traffic loads to thereby provide elasticity and auto-scale of WAN optimization cloud services to clients.

A second determination determines if the usage bandwidth is greater than a second predefined (LOW) threshold at step 340. If yes, then the system continues to monitor. If no, then the WAN optimization platform is disabled and the virtual instance is destroyed at step 345. Next at step 355, a determination is made if cloud services are still existing. If yes cloud services still exist, then the system continues to monitor the data usage of the client. If no cloud services do not exist, then the process 300 ends at step 360, and the resources are then available for other customers/clients of the cloud.

It should be noted that while certain steps within procedure 300 may be optional as described above, the steps shown in FIG. 3 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

Figure 4:
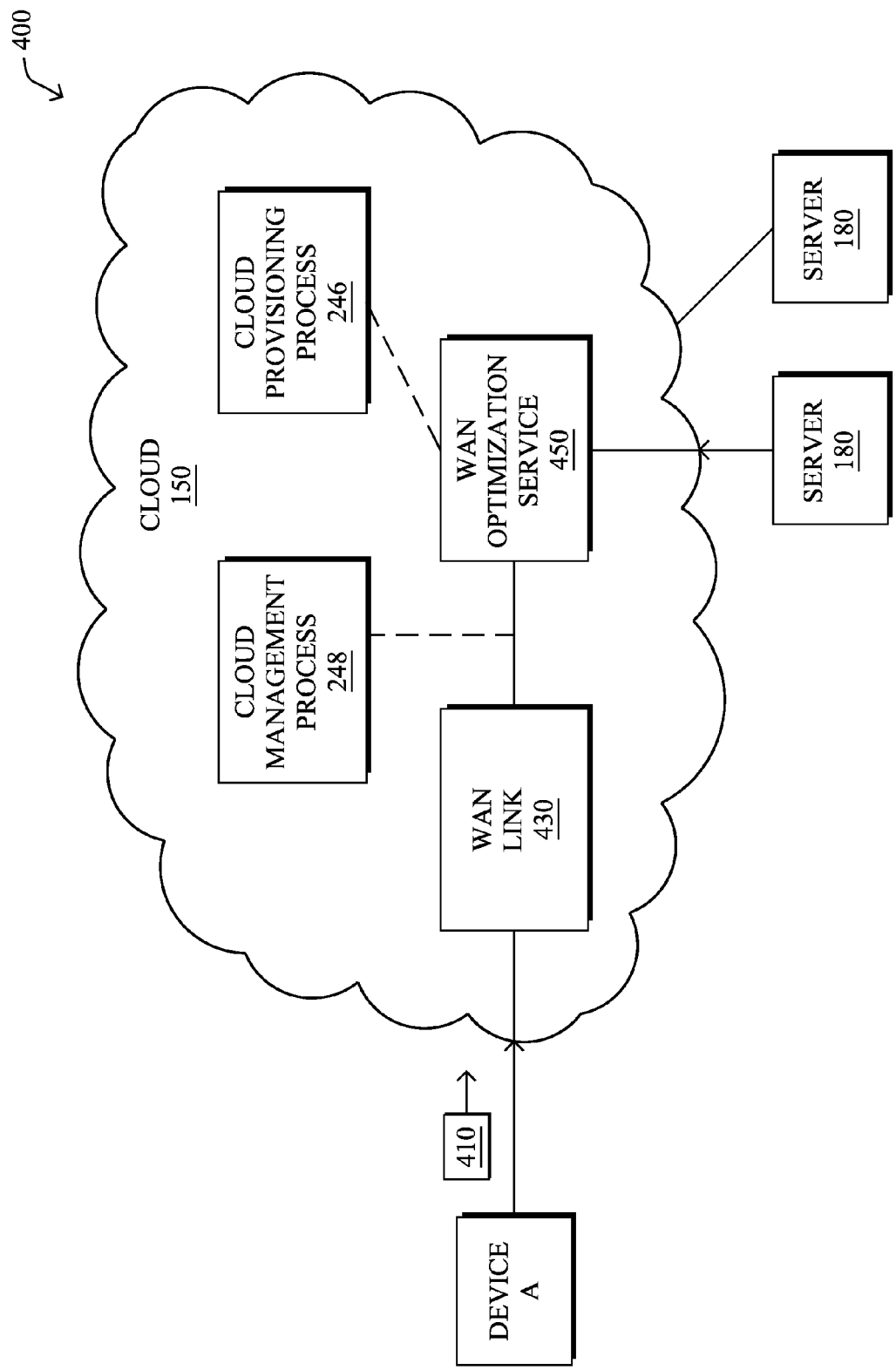
FIGS. 4-5 illustrate examples of providing WAN optimization services.

FIG. 4 is a schematic block diagram of an example computer network 400 illustratively comprising Device A interconnected to cloud 150. Cloud 150 provides virtualized resources including storage, networking, processing, etc. to device A. Device A may be a computer, thin client, set-top box, mobile phone, smart television, server, corporation, etc.

Computer network 400 depicts one example of when a WAN optimization platform 450 may be provisioned to a client (Device A). For example, a client (device A) selects to save a folder on cloud 150 using virtualized storage resources of servers 180. As the packets 410 are sent from device A to cloud 150, a WAN link 430 connects device A to virtualized storage resources. The cloud management process 248 monitors usage bandwidth as Device A transfers data to the cloud. If the usage bandwidth goes above a first predetermined level, then the cloud provisioning process 246 generates a virtual instance of a WAN optimization platform 450, and configures the virtual WAN optimization platform 450 within cloud 150 between the source of incoming data and the destination of data. The WAN optimization platform 450 may optimize the traffic using one or more different optimization techniques. The techniques may also compression, data redundancy elimination, and/or TCP flow optimization. When the WAN optimization platform 450 is deemed not necessary, then the WAN optimization platform virtual instance is destroyed. Destroying the virtual instance frees up resources for others clients of the cloud to access.

Figure 5:
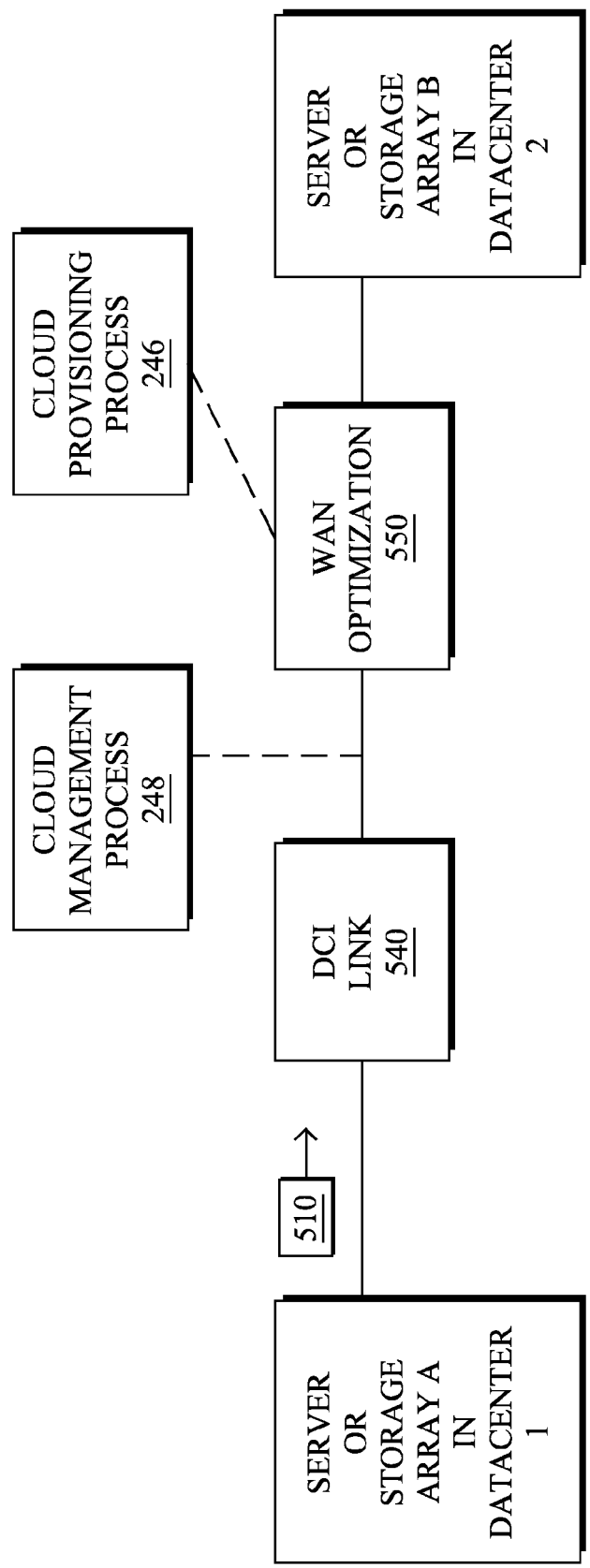

The use of the WAN optimization platform allows a cloud system to charge a fee for use of the WAN optimization platform to a customer/client. The benefit to the client is that the client pays a lower fee on data transfer because less data is transferred due to techniques within the WAN optimization platform, such as compression, data redundancy elimination, and/or TCP flow optimization. Additionally, the client only pays for the WAN optimization platform when needed, and thus the client has a lower overall cost than paying for WAN optimization all the time. Further, the client benefits from lower bandwidth usage and better application performance from the cloud being less taxed. The benefit to the cloud service provider from enabling the WAN optimization platform is there is less strain on the cloud because of excess data usage and transmission. The cloud service provider is also able to service more customers/clients with existing WAN links FIG. 5 is a schematic block diagram of an example computer network 500 illustratively comprising Server or Storage Array A and Server or Storage Array B interconnected by cloud 150. For example, Server A may be generating a disaster recovery backup on Server B, where server B is located in different physical location than Server A, such as a different Data Center in a different state or country. Packets 510 are sent from server or storage-array A to cloud 150. Cloud 150 provides one or more data center interconnect (DCI) links 540 to connect Server or Storage-Array A and Server or Storage-Array B via cloud 150. The initiation of the DCI links or the request for multiple links to send backup data to Server B may automatically initiate the cloud monitoring process 248 (or cloud provisioning process 246) to provision a WAN optimization platform 550 on the one or more DCI links. Alternatively, the WAN optimization platform 550 may be provisioned in response to the data usage going above a first predefined threshold. Another alternative is that the WAN optimization platform 550 may be deployed based on data replication intervals.

The WAN optimization platform 550 allows for less DCI links as the data is sent more efficiently because compression, data redundancy elimination, TCP flow techniques, and/or other optimization techniques are applied to the data. As a result, the cloud service provider does not need to maintain high bandwidth links between zones or data centers, or the cloud service provider can maintain less high bandwidth links. Additionally, the cloud service provider can apply the WAN optimization platform to other clients when the backup is not being generated by Server A.

Also, the cloud monitoring process 248 may monitor data storage arrays of data stored within the cloud and data replication intervals and generate or instruct the cloud provisioning process 246 to generate a WAN optimization platform 550 for the backup of data to a second server or storage-array.

The techniques described herein, therefore, provide for automatically deploying a WAN optimization platform. In particular, the techniques herein dynamically determine when a client is above a predetermined threshold and provisions the WAN optimization platform for the client.

The on-demand deployment reduces the cost for both cloud service provider and clients as well as compute and storage load on the cloud system i.e. resources consumed by WAN optimization platforms in use are not reserved forever, and when not needed return to a shared pool of resources. Cloud service providers can offer WAN optimization as a service to consumer only when consumer needs it thereby reducing the service charge. Cloud consumer also pays for lesser cloud bandwidth usage due to WAN optimization. Cloud service provider can save bandwidth while reducing latency and can improve cloud service provider's network over-subscription. Cloud service provider can provision fewer links for DCI/DR by utilizing on-demand WAN optimization during DCI data replication intervals. Network elements become a dynamic part of the cloud architecture.

While there have been shown and described illustrative embodiments that provide for automatic deployment of a WAN optimization platform in a shared-cloud communication network, it is to be understood that various other adaptations and modifications may be made within the spirit and scope of the embodiments herein. For example, the embodiments have been shown and described herein with relation to cloud networks. However, the embodiments in their broader sense are not as limited, and may, in fact, be used with other types of shared networks. Also, while the techniques generally describe initiation and determinations by a cloud monitoring process, a network management system/server (NMS) may also be used to provide intelligence to the network functions described herein, such that the NMS determines data usage rates, and may select when to provision a WAN optimization platform, etc. Additionally, the intelligence and techniques described herein can also be applied to Software Defined Networks (SDN), such that a SDN Controller monitors the data flows and data bandwidth usage rates, and can determine when to dynamically instantiate and delete a WAN Optimization platform for different customers/flows.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   providing, via the computing device, cloud services to a client over a cloud network;
   monitoring, by the computing device, data usage of the client over a wide area network (WAN);
   determining, by the computing device, if the data usage of the client is above a first predetermined threshold;
   in response to determining the data usage of the client is above the first predetermined threshold, dynamically implementing, by the computing device, a wide area network (WAN) optimization platform within the cloud network, without any user intervention, wherein the WAN optimization platform is implemented between a source and a destination of the client to modify data being transferred by the client in order to optimize a data transfer and lower data usage bandwidth in the WAN for the client, wherein the WAN optimization platform comprises a set of resources configured to provide one or more WAN optimization techniques for increasing data-transfer efficiencies across the WAN;
   determining if the data usage of the client is below a second predetermined threshold; and
   in response to determining the data usage of the client is below the second predetermined threshold, dynamically disabling, by the computing device, the WAN optimization platform within the cloud network for the client, without any user intervention, wherein the first predetermined threshold is greater than the second predetermined threshold;
   determining based on cloud services used by the client, if the cloud services are a high data volume transaction/service; and
   in response to determining the cloud services are a high data volume transaction/service, dynamically provisioning the WAN optimization platform within the cloud between source and destination.

2. The method as in claim 1, wherein the first predetermined threshold and the second predetermined threshold include an upload threshold for data sent to the cloud and a download threshold for data sent from the cloud to the client.

3. The method as in claim 1, wherein the first predetermined threshold and the second predetermined threshold may be different values for different clients.

4. The method as in claim 1, wherein the values of the first predetermined threshold and the second predetermined threshold may be vary based on time of day or day of the week.

5. The method as in claim 1, further comprising:
   determining if the deployed WAN optimization platform is sufficient to handle the traffic load generated by the client over the WAN; and
   in response to determining the deployed WAN optimization platform is insufficient, dynamically implementing additional WAN optimization platforms to handle the client's WAN traffic loads.

6. The method as in claim 1, wherein the WAN optimization platform is a virtual instance.

7. The method as in claim 6, further comprising:
   destroying the virtual instance for the client within the cloud network after the virtual instance is disabled.

8. The method as in claim 1, wherein the WAN optimization platform is a shared physical resource of the cloud network.

9. The method as in claim 8, further comprising:
   reallocating the WAN optimization platform to the cloud network for other customers/clients.

10. The method as in claim 1, wherein the WAN optimization platform reduces data usage by applying at least one of compression, data redundancy elimination, or transmission control protocol (TCP) flow optimization.

11. The method as in claim 1, wherein the first predetermined threshold is a percentage based on standard usage.

12. An apparatus, comprising:
    one or more network interfaces to communicate with one or more clients;
    a processor coupled to the network interfaces and adapter to execute one or more processes; and
    a memory configured to store a process executable by the processor, the process when executed operable to:
    provide cloud services to the one or more clients over a cloud network;
    monitor data usage of each client on a per client basis;
    determine whether the data usage of any client is above a first predetermined threshold;
    automatically implement a wide area network (WAN) optimization platform within the cloud network in response to determining the data usage of a particular client is above the first predetermined threshold, wherein the WAN optimization platform is implemented between a source and a destination of the client in order to modify data being transferred by the client to optimize a data transfer and lower data usage bandwidth in the WAN for the client, wherein the WAN optimization platform comprises a set of resources configured to provide one or more WAN optimization techniques for increasing data-transfer efficiencies across the WAN;
    determine if the data usage of the particular client is below a predetermined threshold; and
    in response to determining the data usage of the particular client is below the second predetermined threshold, disable the WAN optimization platform for the client within the cloud network and return the WAN optimization platform to shared resources of the cloud network, wherein the first predetermined threshold is greater than the second predetermined threshold;

determining based on cloud services used by the client, if the cloud services are a high data volume transaction/service; and in response to determining the cloud services are a high data volume transaction/service, dynamically provisioning the WAN optimization platform within the cloud between source and destination.

13. The apparatus as in claim 12, wherein the process monitors the data usage of at least one of WAN, storage area network (SAN), or local area network (LAN) links.

14. The apparatus as in claim 12, wherein the process monitors the data usage using at least one of netflow or Network Based Application Recognition (NBAR), or SPAN/Network Analysis technologies.

15. The apparatus as in claim 12, wherein the process automatically implements the WAN optimization platform as response to determining replication of data from monitored data replication intervals and data storage arrays for Data Center Interconnect and Disaster Recovery services.

16. The apparatus as in claim 12, wherein particular client is any type of electronic device or a group of electronic devices.

17. The apparatus as in claim 12, wherein the apparatus is a separate entity than one or more Servers and virtual machines (VMs) within the cloud and the process to provide cloud services is performed by a standalone Cloud Assurance systems and the process to provide WAN optimization platform is provided by a standalone Cloud Orchestration system.

18. The apparatus as in claim 12, wherein the apparatus is further configured to send and receive policies from a Software Defined Networking (SDN) controller.

19. The apparatus as in claim 12, wherein the WAN optimization platform comprises a set of resources configured to provide one or more WAN optimization techniques for increasing data-transfer efficiencies across the WAN.

20. A tangible, non-transitory, computer-readable media having software encoded thereon, the software when executed by a processor operable to:

provide cloud services to the one or more clients over a cloud network;

monitor data usage of each client on a per client basis;

determine if the data usage of any client is above a first predetermined threshold;

automatically implement a WAN optimization platform within the cloud network in response to determining the data usage of the particular client is above the first predetermined threshold, wherein the WAN optimization platform is implemented between a source and a destination of the client to modify data being transferred by the client in order to optimize a data transfer and lower data usage bandwidth in the WAN for the client, wherein the WAN optimization platform comprises a set of resources configured to provide one or more WAN optimization techniques for increasing data-transfer efficiencies across the WAN;

determine if the data usage of the particular client is below a predetermined threshold; and in response to determining the data usage of the particular client is below the second predetermined threshold, disable the WAN optimization platform for the client within the cloud network and return the WAN optimization platform to shared resources of the cloud network, wherein the first predetermined threshold is greater than the second predetermined threshold;

determining based on cloud services used by the client, if the cloud services are a high data volume transaction/service; and in response to determining the cloud services are a high data volume transaction/service, dynamically provisioning the WAN optimization platform within the cloud between source and destination.

* * * * *